United States Patent
Kornilovich et al.

(10) Patent No.: US 8,702,997 B2
(45) Date of Patent: Apr. 22, 2014

(54) BALANCING A MICROELECTROMECHANICAL SYSTEM

(75) Inventors: Pavel Kornilovich, Corvallis, OR (US); Vladek Kasperchik, Corvallis, OR (US); James William Stasiak, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/151,539

(22) Filed: Jun. 2, 2011

(65) Prior Publication Data

US 2012/0306030 A1   Dec. 6, 2012

(51) Int. Cl.
*C23F 1/00*   (2006.01)

(52) U.S. Cl.
USPC .................................. 216/2; 257/414; 438/5

(58) Field of Classification Search
None
See application file for complete search history.

(56) References Cited

U.S. PATENT DOCUMENTS

| | | | |
|---|---|---|---|
| 5,132,248 A * | 7/1992 | Drummond et al. | 505/325 |
| 6,114,796 A | 9/2000 | Mizuguchi et al. | |
| 6,398,350 B2 | 6/2002 | Kitahara | |
| 6,707,351 B2 | 3/2004 | Gorrell | |
| 6,763,718 B1 * | 7/2004 | Waters et al. | 73/514.26 |
| 7,282,834 B2 | 10/2007 | Kubena et al. | |
| 7,307,496 B2 | 12/2007 | Huang et al. | |
| 2004/0154400 A1 * | 8/2004 | Johnson et al. | 73/514.01 |
| 2007/0069612 A1 | 3/2007 | Sato | |
| 2009/0301193 A1 | 12/2009 | Schwartz et al. | |

FOREIGN PATENT DOCUMENTS

GB    2272053 A    5/1994

OTHER PUBLICATIONS

Chen, Wet and Dry Etching, Apr. 12, 2004, Harvard, p. 1.*

* cited by examiner

*Primary Examiner* — Binh X Tran
*Assistant Examiner* — David Cathey, Jr.

(57) ABSTRACT

A method of balancing a microelectromechanical system comprises determining if a microelectromechanical system is balanced in a plurality of orthogonal dimensions, and if the microelectromechanical system is not balanced, selectively depositing a first volume of jettable material on a portion of the microelectromechanical system to balance the microelectromechanical system in the plurality of orthogonal dimensions. A jettable material for balancing a microelectromechanical system comprises a vehicle, and a dispersion of nano-particles within the vehicle, in which the total mass of jettable material deposited on the microelectromechanical system is equal to the weight percentage of nano-particles dispersed within the vehicle multiplied by the mass of jettable material deposited on the microelectromechanical system. A microelectromechanical system comprises a number of unbalanced structures, and a number of droplets of jettable material disposed on the unbalanced structures, in which the droplets of jettable material balance the unbalanced structures in a plurality of orthogonal dimensions.

13 Claims, 5 Drawing Sheets

BALANCING A MICROELECTROMECHANICAL SYSTEM

BACKGROUND

Microelectromechanical systems (MEMS) are integrated devices or systems that combine electrical and microscopic mechanical components. MEMS devices are used as sensors and actuators in a vast array of products such as, for example, gyroscope systems, automobile airbag systems, inkjet printheads, accelerometers, bio-sensing systems, pressure systems, television displays, and fiber optic systems, among many others. Frequently in these areas of technology, the MEMS are utilized in a way that the balance within the MEMS is a function or purpose of the MEMS.

Often, however, these MEMS are unbalanced after fabrication. In this situation, a MEMS ceases to function for its intended purpose due to its unbalanced state. Tuning methods used to balance or rebalance an unbalanced MEMS may include removing material by chemical methods such as etching or physical methods such as carving or machining. These methods are often too imprecise and not practical in situations where the MEMS is fabricated at a sub-micron scale. Further, addition of material to the MEMS is not used because of the lack of efficient methods of depositing small mass increments on various portions of the MEMS.

BRIEF DESCRIPTION OF THE DRAWINGS

The accompanying drawings illustrate various examples of the principles described herein and are a part of the specification. The illustrated examples are given merely for illustration, and do not limit the scope of the claims.

DETAILED DESCRIPTION

The present specification discloses a system and method of mass balancing or rebalancing of MEMS using high-precision jetting of a number of droplets of jettable material comprising a varied weight percentage of solid content and at various droplet sizes or volumes. The system and method utilize a number of inkjet printheads that eject droplets that may be as small as several picoliters. By adjusting droplet size and the weight percentage of the solid content of the jettable material ejected from the inkjet printheads, a wide range of mass increments is achieved, and an efficient, accurate, and precise method of balancing a MEMS is accomplished. Further, the ability to jet multiple drops at a fast rate and with a sub-micron positioning accuracy using the inkjet printheads creates a very flexible mass-balancing system and method. Thus, the present system and method provides for mass-fabrication and balancing of high-precision MEMS devices such as accelerometers, gyroscopes, and clock references, among others.

Frequency mismatches may exist along a number of axes of a MEMS device after the MEMS device is fabricated. Previous methods of "tuning" or balancing electronic devices like MEMS include, for example, removing the material by chemical etching or physically carving or machining material from the device. Laser micromachining is one example of a physical machining process. However, these methods of material removal are far too imprecise, slow, and expensive, can create removal of material at unintended degrees and portions of the MEMS, and cannot match the sub-micrometer scaled placement accuracy of a droplet.

The addition of mass to the MEMS for balancing or tuning presents other issues. For example, one method of adding mass includes vapor deposition. However, vapor deposition does not provide for mass deposition at selective portions of a MEMS. Rather, vapor deposition applies mass throughout the entire device or system. Further, the unbalanced character of the MEMS may vary from one MEMS to another. Therefore, vapor deposition and similar methods do not serve as a viable balancing method.

In some examples, the relative uniformity tolerance for high-performing MEMS is $10^{-5}$ to $10^{-6}$. The same tolerances may be applied to the uniformity of mass distribution within the MEMS. If the size of the MEMS is 1 millimeter in diameter and 10 micrometers in thickness, the total mass of the MEMS is approximately $10^{-5}$ g, or 10 micrograms. Thus, the smallest mass increments/decrements used to balance the MEMS are in the range of $10^{-10}$ to $10^{-11}$ g, or 10 to 100 picograms. At the same time, much larger increments are used to fix more unbalanced MEMS. Thus the "dynamic range" of the balancing method may be multiple orders of magnitude; approximately the range of $10^{-11}$ to $10^{-7}$ g. The present specification discloses a system and method that balances MEMS at the above dynamic ranges and orders of magnitude.

As used in the present specification and in the appended claims, the term "microelectromechanical system," "MEMS," or similar language is meant to be understood broadly as any integrated device or system that combines electrical and mechanical components A MEMS device may be on a microscopic scale or smaller. A MEMS device may be, for example, any system or device that embeds mechanical devices such as gyroscopes, fluid sensors, mirrors, actuators, pressure and temperature sensors, accelerometers, oscillators, microengines, inertial sensors, gravimeters, microtransmissions, optical scanners, fluid pumps, transducers, chemical sensors, flow sensors, vibration sensors, and valves, among others, in a semiconductor chip.

MEMS sense, control, and activate mechanical processes on the micro and sub-micro (nano-electric mechanical systems (NEMS)) scale, and function individually or in arrays to generate effects at these scales. This micro fabrication technology enables fabrication of large arrays of devices, which individually perform simple tasks, but in combination can accomplish complicated functions.

Further, the above-described MEMS may comprise an element with any shape that serves a particular function within the MEMS. As such, these elements may need a particular balance and, consequently, due to manufacturing tolerances and other factors, may be unbalanced in some manner. Examples of shapes of elements within the MEMS that may be unbalanced include symmetric shapes, axi-symmetric shapes, linear shapes, and planar shapes, among others. The present system and method may be applied to any element within a MEMS in order to obtain a balanced microelectromechanical system.

Further, as used in the present specification and in the appended claims, the term "unbalanced" or similar language is meant to be understood broadly as any situation within a MEMS or similar device that causes the function of the MEMS or similar device to become inadequate due to a deficiency or surplus of mass on any particular portion of the MEMS or similar device. In this manner, the unbalanced state causes the MEMS or similar device to not function for its intended purpose. For example, if the MEMS were a MEMS gyroscope, then the unbalancing due to defective or deficient fabrication methods causes the MEMS gyroscope to detect and signal to a connected processor an improper reading. An unbalanced condition within the MEMS may be detected as, for example, an incorrect frequency in vibrations, a quadrature error, or an incorrect alignment, among others. Further, an unbalanced condition within the MEMS may be with respect to a plurality of orthogonal dimensions such as, for example, along at least two of the x-axis, y-axis, and z-axis.

Still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

By way of illustration, the present specification and figures describe specific examples of a MEMS gyroscope. MEMS gyroscopes are devices that measure or maintain orientation based on principles of angular momentum and are used in many applications, such as, vehicle stability control, rollover detection, navigation, load leveling, suspension control, platform stabilization, antenna stabilization, computer input devices, handheld computing devices, game controllers, and navigation of autonomous guided vehicles, among others.

Although the present specification and drawings describe and depict MEMS gyroscopes, the principles described herein may be applied to any type of MEMS device. In other words, the principles apply to any MEMS device whose functionality, accuracy, or precision is negatively affected if the MEMS device is unbalanced.

Figure 1:
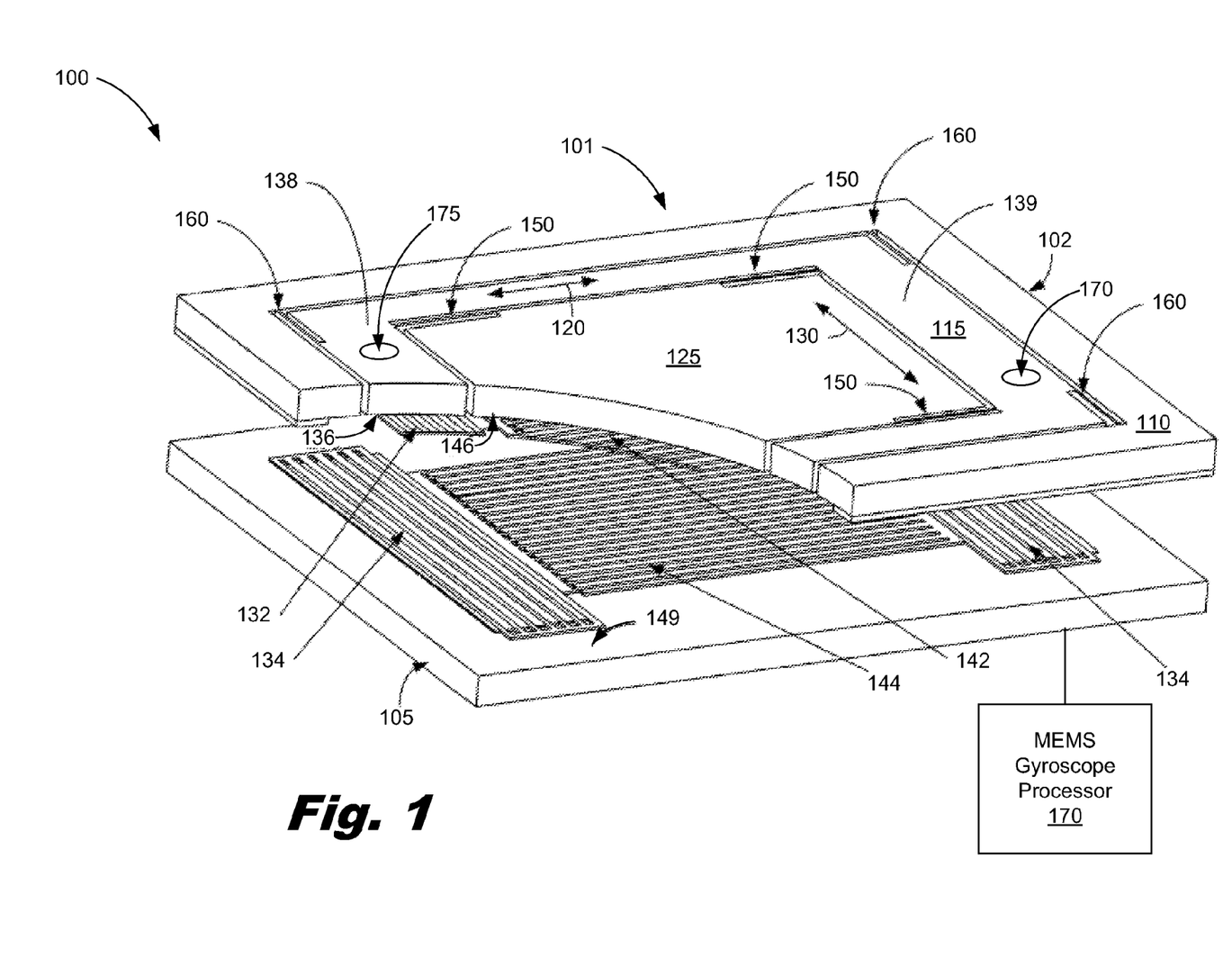
FIG. 1 is a perspective, exploded, and partially cut-away view of an MEMS gyroscope, according to one example of the principles described herein.

Turning now to the figures, FIG. 1 is a perspective, exploded, and partially cut-away view of a MEMS gyroscope system (100), according to one example of the principles described herein. The MEMS gyroscope (101) of the MEMS gyroscope system (100) includes a top substrate (102) and a bottom substrate (105). The top substrate (102) comprises an outermost structure (110), a number of sensing structures (115), and a number of driving structures (125). In this example, the outermost structure (110) and the sensing structure (115) define openings in their centers, and are enclosed similar to that of a picture frame.

The outermost structure (110) is generally fixed and does not move. The driving structure (125) is coupled to and supported by the sensing structure (115) via flexural suspension elements (150) (e.g., flexural microbeams and/or pivot members), which allow motion of the driving structure (115) in the direction (130) that is orthogonal to the composite motion (120) allowed by flexural suspension elements (160). The sensing structure (115) and the driving structure (125) are disposed within and supported by the outermost structure (110) using flexural suspension elements (160) (e.g., flexural microbeams and pivot members). The flexural suspension elements (160) and (150) allow motion of the composite structure, and, particularly, the sensing structure (115) and the driving structure (125).

The sensing structure (115) includes first sensing electrodes (132) that are disposed on a bottom surface (136) of the sensing structure (115) and aligned parallel to at least one side wall (138) and/or (139) of the sensing structure (115). In the example of FIG. 1, the first sensing electrodes (132) are disposed on the bottom surface (136) of the left and right side walls (138) and (139) of the sensing structure (115). The driving structure (125) includes first driving electrodes (142) that are disposed on a bottom surface (146) of the driving structure (125). The first driving electrodes (142) are disposed adjacent to and perpendicular to the first sensing electrodes (132).

The bottom substrate (105) is disposed below the top substrate (102) and includes second sensing electrodes (134) and second driving electrodes (144) that are disposed on a top surface (149) of the bottom substrate (105) and substantially below the first sensing electrodes (132) and the first driving electrodes (142), respectively. The first and second sensing electrodes (132) and (134) and the first and second driving electrodes (142) and (144) provide a capacitance signal based on the movement of the sensing structure (115) and the driving structure (125), respectively.

The capacitance signal (e.g., a change in voltage or current due to a change in capacitance between the sensing electrodes) is generated based on the sensing structure (115) and driving structure (125) moving perpendicular to the second sensing electrodes (134) and second driving electrodes (144) in the horizontal direction (120) and vertical direction (130), respectively. In some examples, a capacitance signal is produced based on rotational movement between the electrodes.

Operation of the MEMS gyroscope (101) is based on the principle of coupling two or more orthogonal degrees-of-freedom of a suspended spring-mass structure. Thus, although a MEMS gyroscope with two degrees of freedom is depicted in FIG. 1, a MEMS gyroscope with more than two degrees of freedom may apply principles described herein. In one example, the sensing structure (115) and driving structure (125) are mass-damping-spring structures. The dynamic mode of the sensing structure (115) and driving structure (125) can be translational and/or rotational, which depends on the operational principles. In one example, the driving electrodes (142) between the driving structure (125) and the bottom substrate (105) provide an electrostatic force to vibrate the driving structure (125) at a controlled amplitude and frequency when a voltage pattern is applied. Energy from the vibrating driving structure (125) is transferred to the sensing structure (115), which is tuned to receive energy at the drive frequency and through coupling by the Coriolis force when the gyroscope is rotated around its input axis. The sensing electrodes (134) between the sensing structure (115) and the bottom substrate (105) provide a capacitance signal when the sensing structure (115) is moving. By capacitively detecting movement of the sensing structure (115) using the sensing electrodes (134), the rotational signal can be generated.

The MEMS gyroscope system (100) further comprises a MEMS gyroscope processor (170). The MEMS gyroscope processor (170) is communicatively coupled to the MEMS gyroscope (101). Signals are sent from the MEMS gyroscope (101) to the MEMS gyroscope processor (170) where the MEMS gyroscope processor (170) interprets those signals as changes in the environment such as, for example, changes in angular momentum relative to the MEMS gyroscope (101). In one example, the MEMS gyroscope (101) provides signals to the MEMS gyroscope processor (170) as digital input, analog input, or combinations thereof.

As described above, after the MEMS device is fabricated, the MEMS device may include defects within the MEMS device that cause the MEMS device to become unbalanced. In one example, the MEMS (101), due to an incorrect initial fabrication, has a number of portions (170) that cause the MEMS gyroscope (101) to become unbalanced in a number of degrees of freedom or axes. In this example, the unbalanced nature of that portion (170) of the MEMS gyroscope (101) is due to a higher concentration of material at that portion of the MEMS gyroscope (101) relative to other portions of the MEMS gyroscope (101), or non-uniform etch of the structural features of the MEMS such as, for example, thin gaps and flexural supports (150) and (160). These imperfections lead to unequal stiffness of different springs, and, as a result, to quadrature errors and other imperfections. As will be discussed in more detail below, these imperfections can be corrected by adding mass to the MEMS (101) in specified portions (175). As depicted in FIG. 1, portion (170) is a portion within the MEMS (101) that, for at least one of the reasons noted above, has too much mass and, thus, causes the MEMS (101) to be unbalanced. In this example, in order to balance the MEMS (101), more mass is added to portion (175), for example. In this manner, the MEMS (101) is balanced by addition of mass to the portion (175). In another example, in order to balance the MEMS (101) mass is subtracted from the portion (170). In this example, an etching fluid is selectively applied to portion (170) to remove mass. Balancing through the deposition of more mass or deposition of an etching fluid to subtract mass will be described in more detail below.

Figure 2:
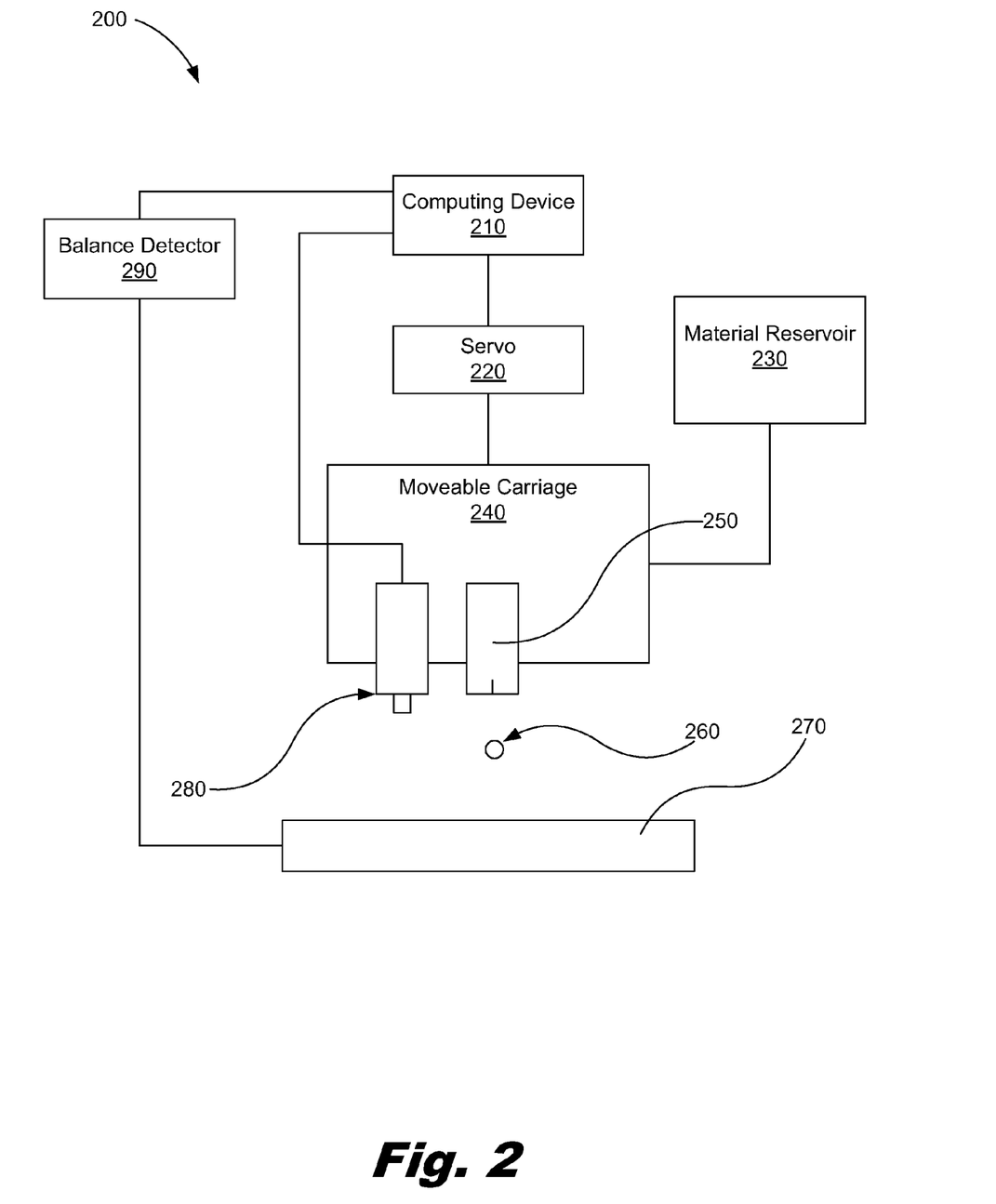
FIG. 2 is a diagram of a system for balancing a MEMS, according to one example of the principles described herein.

FIG. 2 is a diagram of a system for balancing a MEMS, according to one example of the principles described herein. As shown in FIG. 2, the balancing system (200) includes a computing device (210) communicatively coupled through a servo mechanism (220) to a moveable carriage (240). The movable carriage (240) comprises an inkjet material dispenser (250) disposed thereon for dispensing a volume of jettable material (260). Further, a material reservoir (230) is fluidly coupled to the inkjet material dispenser (250) to supply jettable material (260) to the inkjet material dispenser (250). A MEMS (270) is located adjacent to the inkjet material dispenser (250). The MEMS (270) receives a jettable material (260) in order to balance the MEMS.

An imaging device (280) is communicatively coupled to the computing device (210) and provides images of the MEMS (270) to the computing device (210) to determine the relative positions of the inkjet material dispenser (250) and the MEMS (270). The balance detector (290) is communicatively coupled to the MEMS (270) and the computing device (210) to provide feedback to the computing device (210) regarding whether the MEMS (270) is balanced and in what way the MEMS may be altered in order to achieve a balanced MEMS (270). The above-mentioned components of the balancing system (200) will now be described in further detail below.

For the purposes of simplicity in illustration, the computing device (210), servo (220), moveable carriage (240), material reservoir (230), inkjet material dispenser (250), imaging device (280), and balance detector (290) are separate devices communicatively coupled to each other via communication paths. However, the principles set forth in the present specification extend equally to any alternative configuration in which a number of these elements are combined in a number of configurations. As such, alternative examples within the scope of the principles of the present specification include, but are not limited to, examples in which any number of the computing device (210), servo (220), moveable carriage (240), material reservoir (230), inkjet material dispenser (250), imaging device (280), and balance detector (290) are implemented by the same device, examples in which the functionality of the computing device (210), servo (220), moveable carriage (240), material reservoir (230), inkjet material dispenser (250), imaging device (280), and balance detector (290) are implemented by multiple interconnected computers and devices, and examples in which a number of the computing device (210), servo (220), moveable carriage (240), material reservoir (230), inkjet material dispenser (250), imaging device (280), and balance detector (290) communicate directly through a bus without intermediary network devices.

The computing device (210) communicatively coupled to the servo mechanism (220) controls the selective deposition of the jettable material (260) onto the MEMS (270). In one example, a digital representation of the desired deposition of jettable material (260) is generated on an application hosted by the computing device (210). The generated representation may then be converted into servo instructions that are stored in a processor readable medium. When accessed by the computing device (210), the instructions housed in the processor readable media are used to control the servo mechanisms (220) as well as the movable carriage (240) and the inkjet material dispenser (250), causing these elements to selectively deposit the jettable material (260) onto the MEMS (270). As some examples, the computing device (210) illustrated in FIG. 2 may be a workstation, a personal computer, a laptop, a personal digital assistant (PDA), or any other data processing device.

The moveable carriage (240) of the balancing system (200) illustrated in FIG. 2 is a moveable material dispenser that may include a number of inkjet material dispensers (250) that dispense the present jettable material (260). The moveable carriage (240) is controlled by the computing device (210) and is moved relative to the MEMS (270) by, for example, a shaft system, a belt system, a chain system, or combinations thereof that comprise the servo mechanism (220). As a desired quantity of the jettable material (260) is dispensed on the portion (175) of the MEMS (270) to balance the MEMS (101), the computing device (210) may controllably position the moveable carriage (240) and direct a number of the inkjet material dispensers (250) to selectively dispense the jettable material (260) at predetermined locations as digitally addressed drops.

The inkjet material dispensers (250) used by the balancing system (200) are any type of inkjet dispenser that performs the present method including, for example, thermally actuated inkjet dispensers, mechanically actuated inkjet dispensers, electro-statically actuated inkjet dispensers, magnetically actuated dispensers, piezo-electrically actuated inkjet dispensers, and continuous inkjet dispensers, among others.

The material reservoir (230) is fluidly coupled to the inkjet material dispenser (250), and houses the jettable material (260) prior to deposition of the jettable material (260). The material reservoir (230) is any container that hermetically seals the jettable material (260) prior to deposition, and is constructed of any number of materials including, for example, metals, plastics, composites, ceramics, or appropriate combinations thereof. The material reservoir (230) houses different jettable materials (260) with a wide range of solid content, and delivers these different jettable materials (260) to the inkjet material dispenser (250) individually as instructed by the computing device (210). As discussed below, the weight percentage (wt %) of solid content within the jettable material (260) is adjustable, and can range from any amount approaching 0 wt % to any amount approaching and including 100 wt %. Thus, the material reservoir (230) houses a number of jettable materials (260) with any weight percentage of solid content. In one example, the weight percentage (wt %) of solid content within the jettable material (260) is between approximately 1 wt % and 50 wt %. Further, in another example, the material reservoir (230) houses an etching fluid as will be discussed in more detail below.

FIG. 2 also depicts the components of the present system that facilitate deposition of the jettable material (260) onto the MEMS (270). As shown in FIG. 2, an imaging device (280) is positioned adjacent to the MEMS (270). In the example depicted in FIG. 2, the imaging device (280) is positioned on the moveable carriage (240). However, in other examples, the imaging device (280) is positioned at a place within the balancing system (200) where it can image the MEMS (270). The imaging device (280) is communicatively coupled to the computing device (210), and captures images of the MEMS (270). The captured images are then used by the computing device (210) to determine the position of the inkjet material dispenser (250) relative to the MEMS (270). In this manner, droplets of jettable material (260) are dispensed with accuracy onto the MEMS (270).

The formation and composition of the jettable material (260) and the inkjet material dispensers (250) will now be described in detail. As described above, the computing device (210) controllably positions the moveable carriage (240) and directs a number of the inkjet material dispensers (250) to selectively dispense the jettable material (260) at predetermined locations as digitally addressed drops. In one example, the inkjet material dispenser (250) ejects jettable material (260) at a firing frequency of approximately 104 Hz. In another example, the inkjet material dispenser (250) ejects jettable material (260) at a firing frequency of approximately 10 kHz. This provides for rapid balancing of the MEMS device (270) while still allowing for deposition of a large range of mass increments. Further, in one example, the inkjet material dispenser (250) jets droplets of jettable material (260) of varying volumes, and at volumes as small as several picoliters. This may be equivalent to approximately $10^{-9}$ grams or 1,000 picograms.

In conjunction with jetting the jettable material (260) at varying volumes, the weight percentage (wt %) of the solid content within a droplet of jettable material (260) is adjusted to achieve varying degrees of solids deposited on the surface of the MEMS (270) after the solvent evaporates or is otherwise removed from the surface of the MEMS (270). In one example, the weight percentage of solid content within the jettable material (260) is adjustable, and can range from any amount approaching 0 wt % to any amount approaching and including 100 wt %. Further, in another example, the range of solid content within the jettable material may be from 0.01 wt % to 50 wt %. In yet another example, the weight percentage (wt %) of solid content within the jettable material (260) may be between approximately 0.1 wt % and 20 wt %. The total mass that is to be deposited on the MEMS (270) is equal to the weight percentage of solid content of the jettable material (260) multiplied by the mass of the droplet of jettable material (260) ejected from the inkjet material dispensers (250).

Further, with regard to the associated solvent within the jettable material (260), the solvent may be any vehicle that can be removed from the jettable material (260) after deposition of the jettable material on the MEMS (270) without leaving a residue on the MEMS (270) and retaining the solid of the jettable material (260) on the surface of the MEM (270). In this example, the solvent does not outgas any mass of the solid within the jettable material (260) throughout the deposition process and any post-jetting processes, but instead leaves the entire amount of solids or a predetermined percentage of solids on the MEMS (270). Examples of solvents include water and alcohols.

Further, in this example, the balancing system (200) including the inkjet material dispenser (250) dispenses the jettable material (260) with any range of solid content within the jettable material (260). In one example, a number of inkjet material dispensers (250) are provided within the balancing system (200) that dispense jettable material (260) comprising different wt % of solid content.

In connection with the above-described variations in deposited volumes and weight percentages of solid content within the jettable material (260), an example may comprise an instance in which 10 picograms (pg) of solid is deposited on the MEMS (270). In this example, if the solid content of the jettable material (260) is 0.1 wt % and the volume of the droplet ejected from the inkjet material dispensers (250) is 2 picoliters (pL), this amount of jettable material (260) results in a 2 picogram balancing mass increment. Conversely, if the jettable material (260) has a solid content of 30 wt % and the volume of the droplet ejected from the inkjet material dispensers (250) is, again, 2 picoliters, this amount of jettable material (260) results in a 600 picogram balancing mass increment.

Any variation in volume and weight percentage of solid content of the jettable material (260) may be applied to the MEMS (270) in obtaining a balanced MEMS (270). Further, using these variations in volume and weight percentage of solid content of the jettable material (260) allows for depositing more precise masses of material on the MEMS (270) in a wide range of mass increments, thus providing for fine tuning of the balance of the MEMS (270). Still further, fewer droplets will be deposited on the MEMS (270) in order to rebalance the MEMS (270) when relatively larger volume droplets of jettable material (260) with relatively greater solid content wt % are employed, and, afterwards, depositing any number of subsequent amounts of jettable material (260) with relatively smaller volumes and relatively lower solid content weight percentages.

Turning now to the chemical makeup of jettable material (260) of the present system and method, in one example, the jettable material (260) used in conjunction with the inkjet material dispenser (250) comprises a dispersion of discrete metal nano-particles, metal oxide nano-particles, semi-metal oxide nano-particles, or combinations thereof. In an example, the nano-particles comprise, for example, $TiO_2$, $Fe_2O_3$, $Al_2O_3$, $SiO_2$ or combinations thereof. The dispersed nano-particles have a particle size of approximately between 1 and 50 nm. Generally, the choice of dispersed material is defined by its environmental stability and the ability to adhere to the surface of the MEMS. One advantage to using metal and semi-metal oxides is that they provide for a high resistance to further oxidation, and, therefore, have a relatively better environmental stability when disposed on the MEMS (270). In the case of nano-particle dispersions in the present example, mass increments are provided by the solid residue of nano-particles randomly scattered on the surface of the MEMS (270) within the droplet footprint, as will be discussed in more detail below.

In another example, the jettable material (260) comprises a solution of a precursor of a functional solid used as a rebalancing material, and a solvent. In this example, the precursor is present in solution in the form of molecules or molecular complexes. After deposition of the jettable material (260), the solvent associated with the precursor evaporates, while the precursor molecules react with each other, the material located on the surface of the MEMS (270), or a combination thereof to form a patch of solid residue. The patch forms a thin film whose additional mass balances the MEMS (270).

The above examples of jettable material (26) may comprise associated pre- and/or post-jetting processes. In one example, a pre-jetting process may comprise, for example, pre-treatment of the working surface of the MEMS (270). In this example, the pre-treatment comprises, for example, a wetting solution comprising a number of surfactants, or an application of a nano-porous adsorbing film such as, for example, silica gel. The pre-treatment facilitates and controls the spread of the jettable material (260) on the surface of the MEMS (270).

Similarly, the above examples of jettable material (260) may comprise associated post-jetting processes. In one example, a post-jetting process comprises, for example, uniform heating of the MEMS (270) to evaporate volatile components of the jettable material such as the solvents, and oxygen plasma ash to remove oxidizeable admixtures such as the surfactants. Post-treatment through heating may also facilitate chemical reactions of the precursor molecules to solidify the jettable material (260), and to improve adhesion of the added mass to the surface of the MEMS (270) (e.g. through formation of covalent bonding).

Examples of post-treatment processes are not limited to the above thermal process. In another example, an oxygen plasma etch is utilized to remove residual organic species and oxidize all remaining elements capable of oxidation in the material deposited on the MEMS (270). This example of a post-treatment process causes the rebalancing mass (deposited jettable material (260) more environmentally stable with respect to the MEMS (270). In another example, a post-treatment process comprises a photochemical process. In yet another example, electromagnetic energy may be applied to the surface of the MEMS (270) in order to react with the material of the MEMS (270). In this example, the electromagnetic energy may react with a chemical deposited via the inkjet material dispenser (250), or may react directly with the material of the MEMS (270).

As disclosed above, the present system and method may be utilized to remove material from portions of the MEMS (270) such as, for example, portion (170). In one example, droplets of an etching fluid at varying sizes are deposited on a surface of the MEMS (270) to selectively remove material from the MEMS (270). In this example, the etching fluid is jetted from the inkjet material dispenser (250) at predetermined locations as digitally addressed drops. The etching fluid is allowed to react with the surface, and particularly, portion (170) of the MEMS (270) to remove material from the MEMS (270). In this manner, the portion (170) of the MEMS (270) that comprises too much mass may be subjected to this precise etching process. In the above example, after the etching fluid is allowed to react with the MEMS (270) a rinsing fluid may be applied to the MEMS (270) in order to remove the etching fluid from the MEMS (270). In this manner, the etching fluid may be allowed to react with the MEMS (270) for a predetermined period of time, after which, when a desired amount of material is etched from the MEMS (270), the rinsing fluid is used to rinse the MEMS (270) and stop the reaction taking place due to the presence of the etching fluid.

In another example, a predetermined amount of etching fluid is applied to the portion (170) of the surface of the MEMS (270). The predetermined amount of etching fluid may be calculated to remove a desired amount of material from the MEMS (270) without the application of a rinsing fluid. In this manner, the etching fluid is allowed to react completely until exhausted. In the above examples, the etching fluid may comprise any jettable material that chemically reacts with the surface of the MEMS (270).

With regard to the above-described jettable material (260), the characteristics of the jettable material (260) may be adjusted to fit an intended purpose. The adjustable characteristics of the jettable material (260) comprise, for example the viscosity of the jettable material, and density, among others. As such, the jettable material (260) may further comprise additives that enhance various properties and characteristics of the resulting jettable material (260). Property enhancing additives that may form a part of the jettable material (260) may include, for example, surfactants, buffers, humectants, co-solvents, biocides, viscosity modifiers, sequestering agents, stabilizing agents, and combinations thereof.

With reference again to FIG. 2, the balancing system (200) comprises a balance detector (290) communicatively coupled to the MEMS (270) and the computing device (210) to provide feedback to the computing device (210) regarding whether the MEMS (270) is balanced, and in what way the MEMS may be altered to balance the MEMS (270). As will be discussed in more detail below, the balance detector (290) detects in an initial state of the MEMS (270) as to whether it is balanced or unbalanced. This data is then sent to the computing device (210) for processing. The computing device (210) then instructs the various elements of the balancing system (200) including the servo mechanism (220), movable carriage (240), and inkjet material dispenser (250) to correct the unbalanced state of the MEMS (270) through selective deposition of jettable material (260) on the MEMS (270) based on the data obtained from the balance detector (290).

In one example, the balance detector (290) detects the presence of too much mass at portion (170) of the MEMS (101), and provides this information to the computing device (210). In one example, the portion (170) of the MEMS (101) that comprises too much mass may include the sensing structure (115), the driving structure (125), or combinations thereof. In another example, the portion (170) of the MEMS (101) that comprises too much mass includes any structure within the MEMS (101). In yet another example, the portion (170) of the MEMS (101) that comprises too much mass may includes any structure in the MEMS (101) whose function is to directly or indirectly sense balance within the MEMS (101).

The computing device (210) then instructs the servo mechanism (220), movable carriage (240), and inkjet material dispenser (250) to deposit the jettable material (260) to portion (175) located opposite portion (170) on the MEMS (101). In an example where the jettable material comprises a vehicle and solid content, the volume and weight percentage of solid content of the jettable material is determined based on how much mass is added to portion (175) to balance the MEMS (101), and is determined by the balance detector (290).

In an example where the jettable material is an etching fluid or other substance that removes mass, the amount of jettable material deposited and duration at which the etching fluid remains on the MEMS (270) is based on how much mass is subtracted from portion (170) to balance the MEMS (101), and is determined by the balance detector (290). In both of the above examples, the balance detector detects what portions (170) of the MEMS (101) include too much mass, where those portions (170) of the MEMS (101) are located, and how much mass is to be selectively added to other portions (175) of the MEMS (101) or subtracted from portions (170) in order to balance out the surplus of mass at portions (170).

The balance detector (290) again determines whether the MEMS (270) is balanced or unbalanced. This process of determining the balance of the MEMS, correcting the balance of the MEMS (270), and re-determining the balance of the MEMS (270) may be performed any number of iterations until the MEMS device is balanced or the MEMS device is balanced within a threshold. The balance detector (290) determines the balance of the MEMS (270) via an excitation method such as, for example, a capacitive or mechanical excitation method, or via a vibration measurement system such as an optical or capacitive vibration measurement system.

Figure 3:
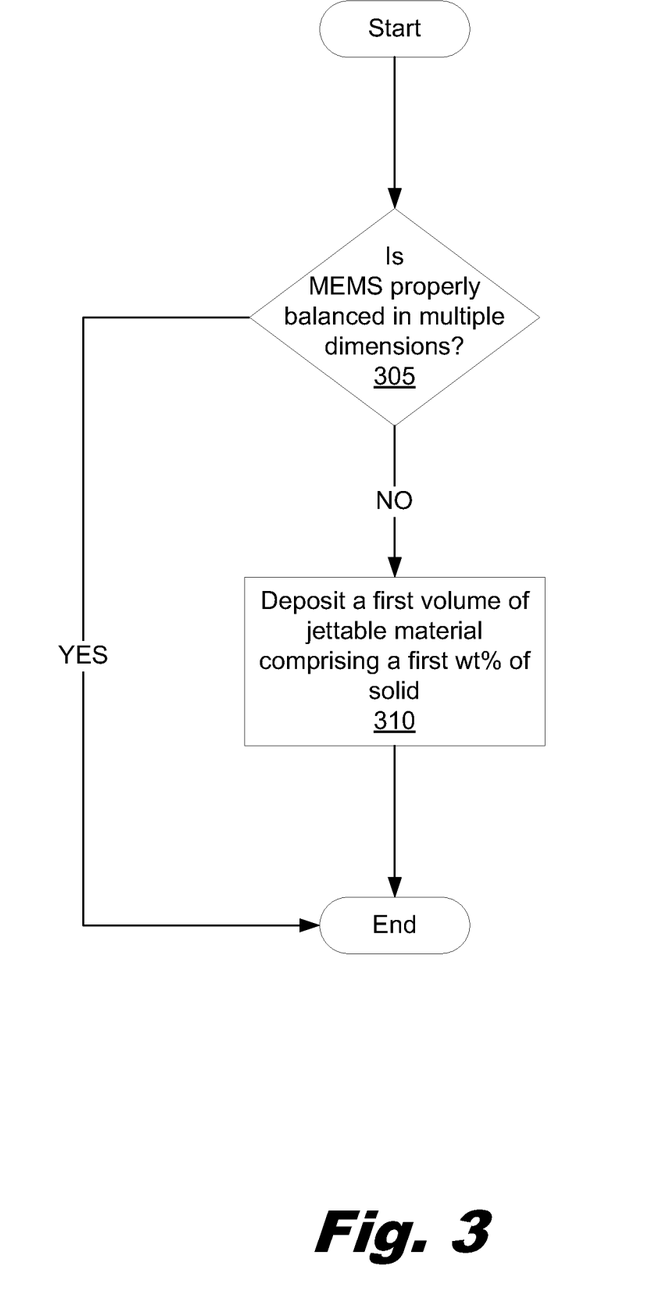
FIG. 3 is a flowchart showing a method of balancing a MEMS using an inkjet material dispenser, according to one example of the principles described herein.

FIG. 3 is a flowchart showing a method of balancing a MEMS (270) using an inkjet material dispenser (250), according to one example of the principles described herein. In this example, the method begins by determining (block 305) if the MEMS is properly balanced. If it is determined that the MEMS (270) is balanced (block 305, determination YES), then the process terminates.

If, however, it is determined that the MEMS (270) is not balanced (block 305, determination NO), then the system (200) proceeds by depositing (block 310) a first volume of jettable material onto a MEMS (270) where the first volume of jettable material comprises a first weight percentage of solids. The inkjet material dispenser (250) is instructed by the computing device (210) to dispense a volume of jettable material (260) comprising a weight percentage of solids onto the MEMS (270) using data collected from the imaging device (280) and the balance detector (280) to balance the MEMS (270) in a plurality of orthogonal dimensions.

Figure 4:
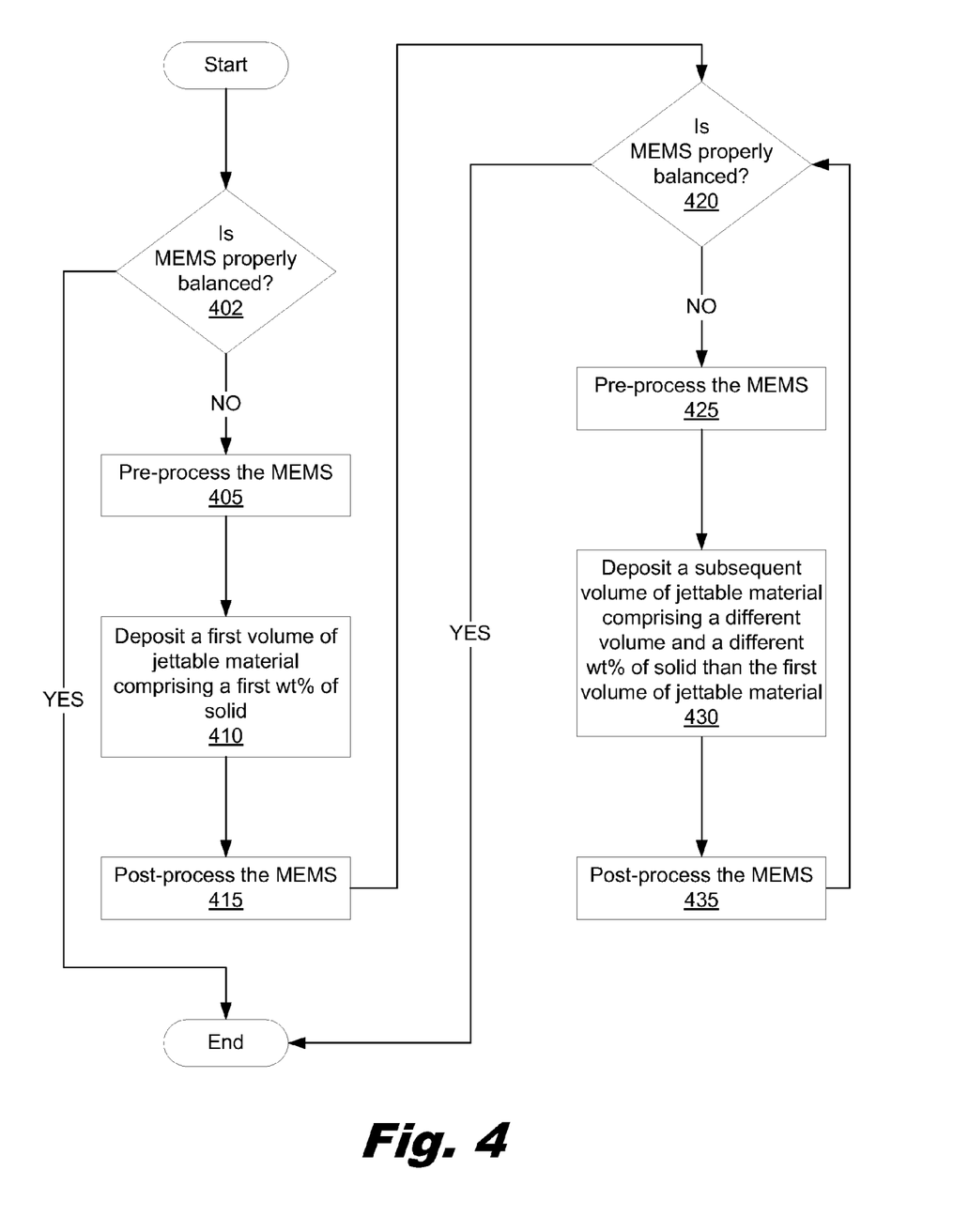
FIG. 4 is a flowchart showing a method of balancing a MEMS using an inkjet material dispenser, according to another example of the principles described herein.

FIG. 4 is a flowchart showing a method of balancing a MEMS (270) using an inkjet material dispenser (250), according to another example of the principles described herein. The method of FIG. 4 begins by determining (block 402) if the MEMS is properly balanced. If it is determined that the MEMS (270) is balanced (block 402, determination YES), then the process terminates. If, however, it is determined that the MEMS (270) is not balanced (block 402, determination NO), then the balancing system (200) proceeds by pre-processing (block 405) the MEMS top prepare the MEMS to receive jettable material (260). Some examples of pre-processing include, pre-treatment of the working surface of the MEMS with a wetting film such as a surfactant or a nano-porous adsorbing film such as a silica gel. The purpose of pre-processing (block 405) the MEMS (270) with these pre-treatments is to facilitate and control the spread of the jettable material (260) across the surface of the MEMS (270).

The balancing system (200) continues with the balancing of the MEMS (270) by depositing (block 410) a first volume of jettable material onto a MEMS (270) where the first volume of jettable material comprises a first weight percentage of solids. The method may continue by post-processing (block 415) the MEMS (270). Some examples of post-processing include, uniform heating of the MEMS (270) to evaporate volatile components of the rebalancing fluid such as, for example, solvents, and to remove oxidizeable admixtures such as, for example, surfactants. Post-processing (block 415) through heating may be utilized to facilitate chemical reactions of the precursor molecules to solidify the rebalancing material and to improve adhesion of the added mass to the resonator surface through, for example, formation of a covalent bond. Post-processing (block 415) may also include, for example, an oxygen plasma etch to remove residual organic species and oxidize any residual elements capable of oxidation. This type of post-processing makes the rebalancing mass more environmentally stable.

The balancing system (200) continues with the balancing of the MEMS (270) by determining (block 420) if the MEMS (270) is balanced or balanced within a threshold. In one example, the balancing detector (280) reevaluates the balance of the MEMS (270) and transmits this data to the computing device (210). If it is determined that the MEMS (270) is balanced (block 420, determination YES), then the process terminates.

If, however, it is determined that the MEMS (270) is not balanced (block 420, determination NO), then another pre-processing (block 425) of the MEMS (270) is performed, and the inkjet material dispenser (250) is again instructed by the computing device (210) to deposit (block 430) a subsequent volume of jettable material (260) comprising a weight percentage of solids onto the MEMS (270) using data collected from the imaging device (280) and the balance detector (280). In one example, the weight percentage of solids within the jettable material (260) and the volume of the jettable material (260) deposited at block 430 is different from the previously deposited volume of jettable material (260) at block 410. In another example, the volume of the jettable material (260) deposited at block 430 is different from the previously deposited volume of jettable material (260) at block 410. In yet another example, the weight percentage of solids within the jettable material (260) deposited at block 430 is different from the previously deposited weight percentage of solids within the jettable material (260) at block 410. Thus, any mass increments are utilized in balancing the MEMS (270).

After depositing (block 430) a subsequent volume of jettable material (260) comprising a weight percentage of solids onto the MEMS (270), another post-processing (435) of the MEMS (270) is performed, and the balancing system (200) again determines (block 420) if the MEMS (270) is balanced or balanced within a threshold. The process may loop through blocks 420, 425, 430, and 435 any number of iterations until the balancing system (200) determines that the MEMS device is balanced or the MEMS device is balanced within a threshold. In one example, feedback is provided by the imaging device (280) and the balance detector (280) to the computing device (210) every time a new volume or droplet of jettable material (260) is added to a portion (175) of the MEMS (270). In this manner, the balancing of the MEMS (270) can be finely tuned using individual droplets of jettable material (260) at each iteration (blocks 420, 425, 430, and 435) with a vast range of volumes and a vast range of weight percentage of solids. Further, in this example, the MEMS (270) may be subjected to several iterations of pre-processing (405, 415) and post-processing (415, 435). Doing so will provide for a more controlled balancing of the MEMS (270), improved adhesion of the jettable material to the MEMS (270), and make the mass added to the MEMS (270) environmentally stable with respect to the MEMS (270).

Figure 5:
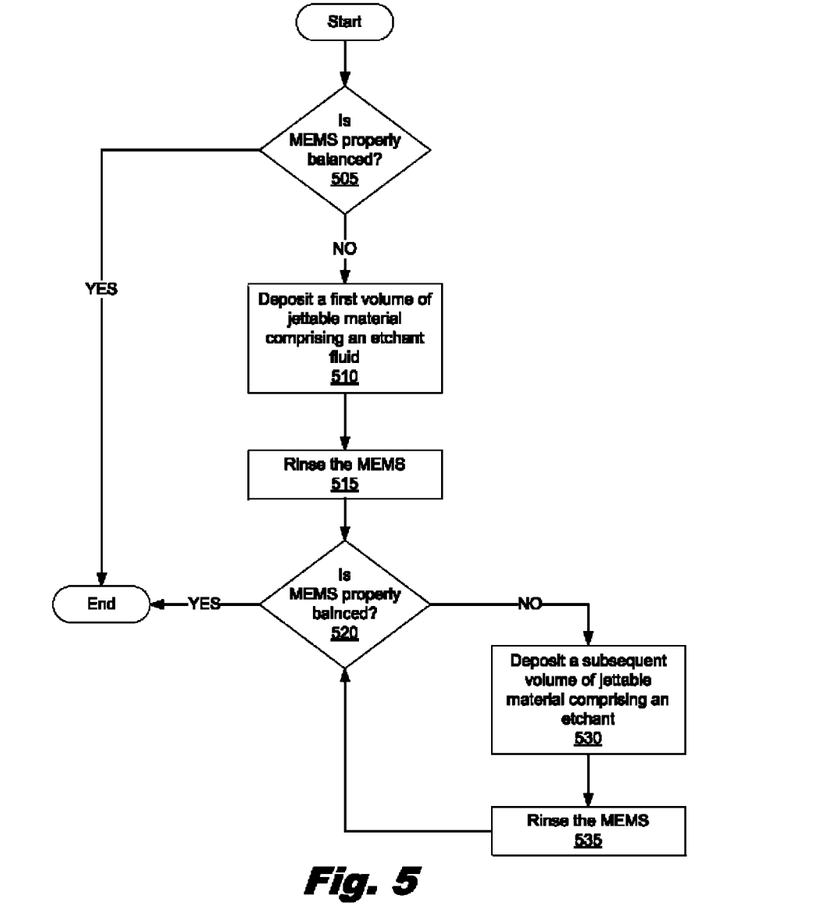
FIG. 5 is a flowchart showing a method of balancing a MEMS using an inkjet material dispenser, according to yet another example of the principles described herein.

FIG. 5 is a flowchart showing a method of balancing a MEMS using an inkjet material dispenser, according to yet another example of the principles described herein. In this example, the balancing system (200) is utilized to remove material from portions (170) of the MEMS (270). The method of FIG. 5 begins by determining (block 505) if the MEMS is properly balanced. If it is determined that the MEMS (270) is balanced (block 505, determination YES), then the process terminates. If, however, it is determined that the MEMS (270) is not balanced (block 505, determination NO), then the balancing system (200) proceeds by depositing (block 510), on a surface of the MEMS (270), a first volume of jettable material (260) comprising an etching fluid to selectively remove material from the MEMS (270). The MEMS is then rinsed (or blow dried if the compound is volatile) (block 515) to remove the etching fluid and to stop the reaction of the etching fluid with the surface of the MEMS (270). In one example, the rinsing (block 515) is delay for a predetermined period of time to allow the etching fluid to react to a degree with the MEMS (270).

In another example, a predetermined amount of etching fluid is deposited (block 510) on a portion (170) of the surface of the MEMS (270). The predetermined amount of etching fluid may be calculated to remove a desired amount of material from the MEMS (270) without the application of a rinsing fluid.

After depositing (510) the etching fluid and rinsing (515) the MEMS (270), the balancing system (200) continues with the balancing of the MEMS (270) by determining (block 520) if the MEMS (270) is balanced or balanced within a threshold. If it is determined that the MEMS (270) is balanced (block 520, determination YES), then the process terminates. If, however, it is determined that the MEMS (270) is not balanced (block 520, determination NO), then the method continues to block 530 where a subsequent volume of jettable material (260) comprising an etching fluid is deposited (block 530) on the MEMS (270).

In one example a different volume of etching fluid is deposited (530) relative to the volume of etching deposited at block 510 in order to remove a different amount of material from the portion (170) of the surface of the MEMS (270). After the subsequent volume of jettable material (260) comprising an etching fluid is deposited (block 530) on the MEMS (270), the MEMS (270) may again be rinsed (block 535). The balancing system (200) again determines (block 520) if the MEMS (270) is balanced or balanced within a threshold. The process may loop through blocks 520, 530, and 535 any number of iterations until the balancing system (200) determines that the MEMS device is balanced or the MEMS device is balanced within a threshold. Thus, in this example, the MEMS (270) may be subjected to several iterations of removal of material from a portion (170) of the surface of the MEMS (270). Doing so will provide for a precision removal of material at predetermined locations using digitally addressed drops of etching fluid.

With regard to FIGS. 3, 4, and 5, the various processes accomplished therein may be performed in sequence or in parallel. For example, addition of mass to portions (175) of the surface of the MEMS (270) as disclosed in FIGS. 3 and 4 may be accomplished at the same time as removal of mass from portions (170) of the surface of the MEMS (270) as disclosed in FIG. 5. In this example, the inkjet material dispenser (250) can dispense a number of types of jettable material (260) including, for example, the above-disclosed solid/solvent material and the etching fluid. In the case of the solid/solvent material, the inkjet material dispenser (250) can dispense the solid/solvent material at varied weight percentages of solid content. In the case of both the solid/solvent material and the etching fluid, the inkjet material dispenser (250) can dispense these materials at varying volumes or droplet sizes.

In one example, the present system and method is scalable over a wafer comprising a number of MEMS. In this example, the inkjet material dispenser (250) comprises a number of nozzles that apply jettable material to a plurality of MEMS located within the wafer simultaneously.

The specification and figures describe a system and method of balancing a microelectromechanical system. The system comprises, and the method utilizes a number of inkjet material dispensers (250) that eject a number of droplets of jettable material comprising a varied weight percentage of solid content and at various droplet sizes or volumes onto a MEMS (270). The jettable material places a desired amount of mass on a portion (175) of the MEMS (270), and, in this manner, balances the MEMS (270). This system and method of balancing a microelectromechanical system may have a number of advantages, including:(1) efficient, cost-effective, precise, and accurate mass-production of balanced MEMS; (2) incremental addition and subtraction of material to and from the MEMS at a scale as low as 1 to 10 picograms; (3) achievement of frequency matching over a plurality of axes of elasticity within the MEMS; (4) ability to fine tune the deposition of mass on a portion (175) of a surface of the MEMS through adjusting the solids content of the jettable material and (5) scalable to a wafer of MEMS.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of balancing a microelectromechanical system comprising:
   determining if a microelectromechanical system is balanced in a plurality of orthogonal dimensions;
   if the microelectromechanical system is not balanced, selectively depositing a first volume of jettable material on a portion of the microelectromechanical system to balance the microelectromechanical system in the plurality of orthogonal dimensions; and
   selectively depositing a subsequent volume of jettable material on a portion of the microelectromechanical system,
   in which the subsequent volume of jettable material comprises a weight percentage of solid content different from the first weight percentage of solid content.

2. The method of claim 1, in which the first volume of jettable material comprises a first weight percentage of solid content to balance the microelectromechanical system in the plurality of orthogonal dimensions.

3. The method of claim 2, further comprising, after depositing the first volume of jettable material on a portion of the microelectromechanical system, determining if the microelectromechanical system is balanced in the plurality of orthogonal dimensions; and
   if the microelectromechanical system is not balanced, selectively depositing the subsequent volume of jettable material on a portion of the microelectromechanical system.

4. The method of claim 3, in which the subsequent volume of jettable material comprises a volume different from the first volume of jettable material.

5. The method of claim 3, further comprising selectively depositing a number of volumes of jettable material on a portion of the microelectromechanical system and determining if the microelectromechanical system is balanced between each deposition of the volumes of jettable material.

6. The method of claim 1, in which the first volume of jettable material comprises an etching fluid, the method further comprising:
   determining if the microelectromechanical system is balanced;
   selectively depositing a first volume of the etching fluid on a portion of the microelectromechanical system;

determining if the microelectromechanical system is balanced; and if the microelectromechanical system is not balanced, selectively depositing a subsequent volume of etching fluid on a portion of the microelectromechanical system, the subsequent volume of etching fluid comprising a volume different from the first volume of etching fluid.

7. The method of claim 6, further comprising selectively depositing a number of volumes of etching fluid on a portion of the microelectromechanical system and determining if the microelectromechanical device is balanced between each deposition of the volumes of etching fluid.

8. The method of claim 4, in which the first volume of jettable material is relatively greater than the subsequent volume of jettable material.

9. The method of claim 1, in which the jettable material comprises:
a vehicle; and
a dispersion of nano-particles within the vehicle, in which the total mass of jettable material deposited on the microelectromechanical system is equal to the weight percentage of nano-particles dispersed within the vehicle multiplied by the mass of jettable material deposited on the microelectromechanical system.

10. The method of claim 9, in which the jettable material comprises environmentally stable metals, metal oxides or semi-metal oxides.

11. The method of claim 9, in which the jettable material comprises a solid content between approximately 0.01 wt % to 50 wt %.

12. The method of claim 9, in which the weight percentage of nano-particles dispersed within the vehicle is adjustable to change the amount of mass added to the microelectromechanical system.

13. The method material of claim 9, in which the volume of jettable material deposited on the microelectromechanical system is adjustable to change the amount of mass added to the microelectromechanical system.

\* \* \* \* \*

UNITED STATES PATENT AND TRADEMARK OFFICE
CERTIFICATE OF CORRECTION

PATENT NO. : 8,702,997 B2  
APPLICATION NO. : 13/151539  
DATED : April 22, 2014  
INVENTOR(S) : Pavel Kornilovich et al.

Page 1 of 1

It is certified that error appears in the above-identified patent and that said Letters Patent is hereby corrected as shown below:

In the Claims

In column 16, line 15, in Claim 13, after "method" delete "material".

Signed and Sealed this
Twenty-ninth Day of July, 2014

Michelle K. Lee
*Deputy Director of the United States Patent and Trademark Office*